US008806036B1

(12) United States Patent
Chickering

(10) Patent No.: US 8,806,036 B1
(45) Date of Patent: Aug. 12, 2014

(54) REWRITER FILTER

(75) Inventor: Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2052 days.

(21) Appl. No.: 11/291,836

(22) Filed: Dec. 2, 2005

(51) Int. Cl.
*G06F 15/16* (2006.01)
*G06F 15/177* (2006.01)

(52) U.S. Cl.
USPC ........... 709/229; 709/246; 709/203; 709/221; 709/231

(58) Field of Classification Search
USPC .......................................... 709/229
See application file for complete search history.

(56) References Cited

U.S. PATENT DOCUMENTS

| 6,317,790 | B1* | 11/2001 | Bowker et al. | 709/225 |
| 2001/0037359 | A1* | 11/2001 | Mockett et al. | 709/203 |
| 2002/0133628 | A1* | 9/2002 | Asplund et al. | 709/246 |
| 2002/0178380 | A1* | 11/2002 | Wolf et al. | 713/201 |

OTHER PUBLICATIONS

URL Rewriting in ASP.NET, Author: Scott Mitchell, ASP.NET Technical Articles, Pub: Mar. 2004 http://msdn.microsoft.com/en-us/library/ms972974.aspx.*

* cited by examiner

*Primary Examiner* — Noel Beharry
(74) *Attorney, Agent, or Firm* — Harrity & Harrity, LLP

(57) ABSTRACT

A network device that rewrites web content may include logic to support the operation of rewriter filters that augment the network device's built-in rewriter. The rewriter filters may be used to correct deficiencies in the built-in rewriter without requiring a new built-in rewriter to be installed.

26 Claims, 5 Drawing Sheets

REWRITER FILTER

FIELD OF THE INVENTION

Implementations consistent with the principles of the invention relate generally to computer and data communications and more particularly to techniques for correcting problems introduced by a rewriter engine operating on a network device.

BACKGROUND OF THE INVENTION

Modern data networks may require that a source device communicate information, such as web content, with a destination device. In certain implementations, the source device may operate through a network device that rewrites the web content so that it can be displayed on the destination device. The network device may operate a rewriting facility to rewrite the web content. In certain situations, the rewriting facility may not correctly rewrite the web content. In these situations, the rewriter facility may have to be modified. Rewriting facilities can be complex so making modifications to them can be costly, time consuming, and prone to causing additional rewriting errors.

Users and/or applications may benefit from techniques that can correct problems associated with rewriting facilities without requiring modifications to a rewriting facility.

SUMMARY OF THE INVENTION

In accordance with an implementation, a network device is provided. The network device may include logic configured to determine if content is to be rewritten using a rewriter filter based on information associated with a rewriter engine, and to call the rewriter filter when it is determined that the content is to be rewritten and rewriting the content using the rewriter filter to generate rewritten content that can be operated on by a destination device.

In accordance with another implementation, a rewriter filter is provided. The rewriter filter may include logic implemented via a general-purpose programming language to receive content on behalf of a rewriter engine, rewrite the content so that a destination device can operate on the rewritten content, and make the rewritten content available to the destination device via an interface.

In accordance with still another implementation, a method to facilitate communication is provided. The method may include calling a rewriter filter that operates in cooperation with a rewriter engine between a first device and a second device and rewriting a request into a first rewritten form via the rewriter filter. The method may include making the first rewritten request available to the second device, and the method may include receiving a response from the second device, where the response is generated by the second device in response to processing the rewritten request.

In accordance with yet another implementation, a method to facilitate communication is provided. The method may include calling a rewriter filter that operates in cooperation with a rewriter engine between a first device and a second device and rewriting a response into a first rewritten form via the rewriter filter. The method may include making the first rewritten response available to the second device.

In accordance with still another implementation, a rewriter is provided. The rewriter may include logic configured to determine if a request or a response is to be rewritten using a filter based on information associated with a rewriter engine. The rewriter may include a filter configured to receive the request or the response if the request or the response is to be rewritten using the filter. The filter may be configured to rewrite the request into a rewritten request that can be processed by a first destination or rewrite the response into a rewritten response that can be processed by a second destination.

In accordance with yet another implementation, a network device is provided. The network device may include means for controlling a rewriter filter; means for receiving content from a source device; means for producing a result by operating on the content, where the result facilitates producing rewritten content that can be operated on by a destination device; means for calling the rewriter filter; means for operating on the result via the rewriter filter to produce the rewritten content; and means for making the rewritten content available to the destination.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may include a network device operating between a public network and a server operating on a private network. The network device may operate a rewriter engine to rewrite web content so that the web content can be displayed through the network device. Implementations may further include rewriter filters that operate in cooperation with the rewriter engine. The rewriter filters may be configured to correct problems introduced by the rewriter engine so that the rewriter engine does not have to be upgraded or rewritten. Rewriter filters, consistent with the invention, may be configured to be selectively turned on and/or off via logic (e.g., software) so that rewriter filters may be turned off when, for example, a software or hardware upgrade to the rewriter engine corrects a problem that a rewriter filter was designed to address.

Exemplary System

Figure 1:
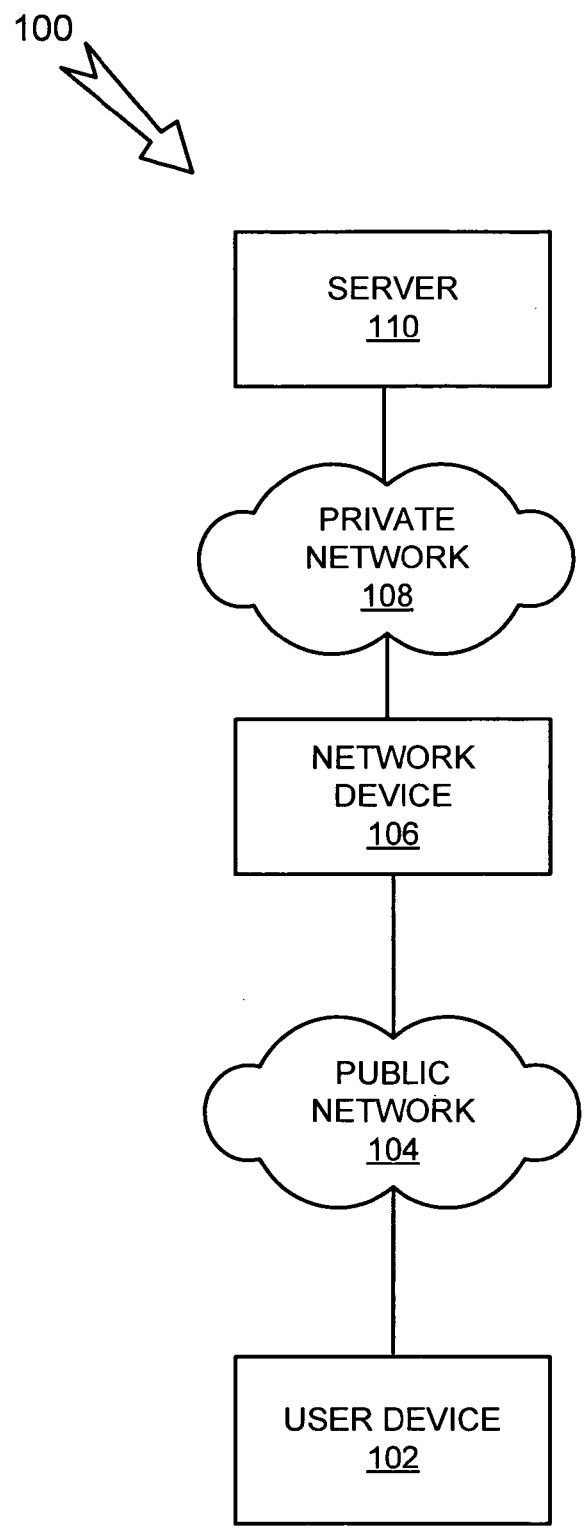
FIG. 1 illustrates an exemplary system that can be configured to operate in accordance with the principles of the invention.

FIG. 1 illustrates an exemplary system that can be configured to operate in accordance with the principles of the invention. System 100 may include a user device 102, a public network 104, a network device 106, a private network 108, and a server 110.

User device 102 (hereinafter user 102) may include any device capable of making a data unit available to a network. "Data unit," as used herein, may refer to any type of machine-readable data having substantially any format that may be adapted for use in one or more networks, such as public network 104 and/or private network 108. A data unit may include packet data and/or non-packet data. User 102 may include a computer, such as a desktop computer, a laptop computer, a client, a server, a personal digital assistant (PDA), a web-enabled cellular telephone, or another computation or communication device.

In one implementation, user 102 may operate as a client device and may include a web browser operating as a communication interface to facilitate communication with one or more destinations, such as server 110, using protocols such as hypertext transport protocol (http). The web browser may operate in conjunction with programming languages, such as hypertext markup language (HTML), extensible markup language (XML), Java, JavaScript, and/or VBScript, and may execute scripts to facilitate communication sessions with a destination device. User 102 may communicate with a destination device, such as server 110, via network device 106.

Public network 104 may include any network capable of transferring a data unit. Implementations of public network 104 may include local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET). Public network 104 may include network devices, such as routers, switches, firewalls, and/or servers (not shown). Public network 104 may be a hardwired network using wired conductors and/or optical fibers and/or may be a wireless network using free-space optical and/or radio frequency (RF) transmission paths. Implementations of networks and/or devices described herein are not limited to any particular data type, and/or protocol.

Network device 106 may also, or alternatively, operate as an edge device between two or more networks. In one implementation, network device 106 may operate as an edge device between public network 104 and/or private network 108. For example, network device 106 may operate as a secure socket layer (SSL) virtual private network (VPN) device to provide secure communication capabilities to a subscriber. Network device 106 may operate to protect devices operating on private network 108 and/or to rewrite messages and/or data into rewritten messages/data that can be used by devices operating on private network 108. In some implementations, some or all of the functionality of network device 106 may be incorporated into other devices, such as server 110 and/or user device 102. Network device 106 may be operated by a service provider and/or an end user, such as a customer.

Network device 106 may include any device capable of receiving a data unit via a network. For example, network device 106 may include an in-line device operating as a firewall that may be configured to filter incoming traffic, an intrusion detection device configured to detect malicious code associated with incoming traffic, and/or a virus protection device configured to examine incoming data units for the presence of malicious code. "Inline network device" may refer to any network device operating in a manner whereby all, or substantially all, data units intended for a destination device pass through the network device before reaching the destination device. Implementations may employ an in-line network device located between a client device and a destination device.

Network device 106 as described in detail below, may implement a rewriter engine to rewrite requests received in a first form into a second form. For example, assume that user device 102 sends a request to network device 106. Network device 106 may examine the request and may determine that the request should be forwarded to server 110. Network device 106 may rewrite the request for consumption by server 110 and may forward the request to server 110. Subsequently, server 110 may send a response back to network device 106. Network device 106 may rewrite the response so that any references to servers in the response are replaced with rewritten references to the network device. The rewritten references may include annotations so that the network device can later determine, when looking at a request generated by such a reference, which server and resource the original reference referred to. Network device 106 may then forward the response to user device 102.

For example, the rewriter engine may rewrite links, such as uniform resource locators (URLs), contained in responses received from server 110 into rewritten links that point to a network device, such as network device 106, that is running the rewriter engine. Network device 106 may remain in the communication path between user 102 and server 110 by causing the rewritten response links to point to network device 106 instead of server 110. The rewritten links that point to network device 106 are annotated with information that allow network device 106 to determine which server to forward rewritten requests to.

In certain situations, a rewriter engine may not be capable of properly transforming some and/or all aspects of communicated data, such as a web application. Assume that a rewriter engine is unable to properly rewrite links in a way that meets the needs of user 102 and/or server 110. Further assume that a link may take the form of pieces of JavaScript code as the link passes through network device 106. Since the link is represented in code portions, the link may not be fully assembled back into a link, as recognized by a web browser operating on user 102, until the JavaScript code runs on user 102. A rewriter engine may need to be modified to correctly operate on the JavaScript code, such as by upgrading and/or rewriting the rewriter engine. Implementations consistent with the principles of the invention may allow an existing rewriter engine to correctly operate on the JavaScript code without being upgraded and/or rewritten through the use of one or more rewriter filters. Rewriter filters may operate with the rewriter engine to correctly operate on the JavaScript code without requiring that any modifications be made to the rewriter engine.

Private network 108 may include any network capable of transporting a data unit. Private network 108 may be a secure network such as a LAN associated with a corporation. Private network 108 may be configured so that all, or substantially all, data intended for a device operating on private network 108 pass through network device 106. For example, network device 106 may operate to intercept data units intended for server 110 operating on private network 108 thereby limiting outside access to server 110.

Server 110 may include any device capable of making data and/or services available to another device operating on private network 108 and/or public network 104. For example, server 110 may include a web server associated with a corporation that may be configured to provide on-line services and/or products to user 102 via public network 104. Implementations may include substantially any number of servers 110 operating alone or in concert. Implementations may further include one or more servers 110 residing in a single private network and/or domain and/or spread across multiple private networks and/or domains.

Server 110 may be configured to require that users be validated before accessing information, such as by providing a valid login name and/or password. Server 110 may be configured to operate with an intermediate network device, such as network device 106, located between a client device, such as user 102, and server 110. Server 110 may be configured to serve information and/or applications to network device 106. The information and/or applications may be rewritten by network device 106 as described above.

Exemplary Device Architecture

Figure 2:
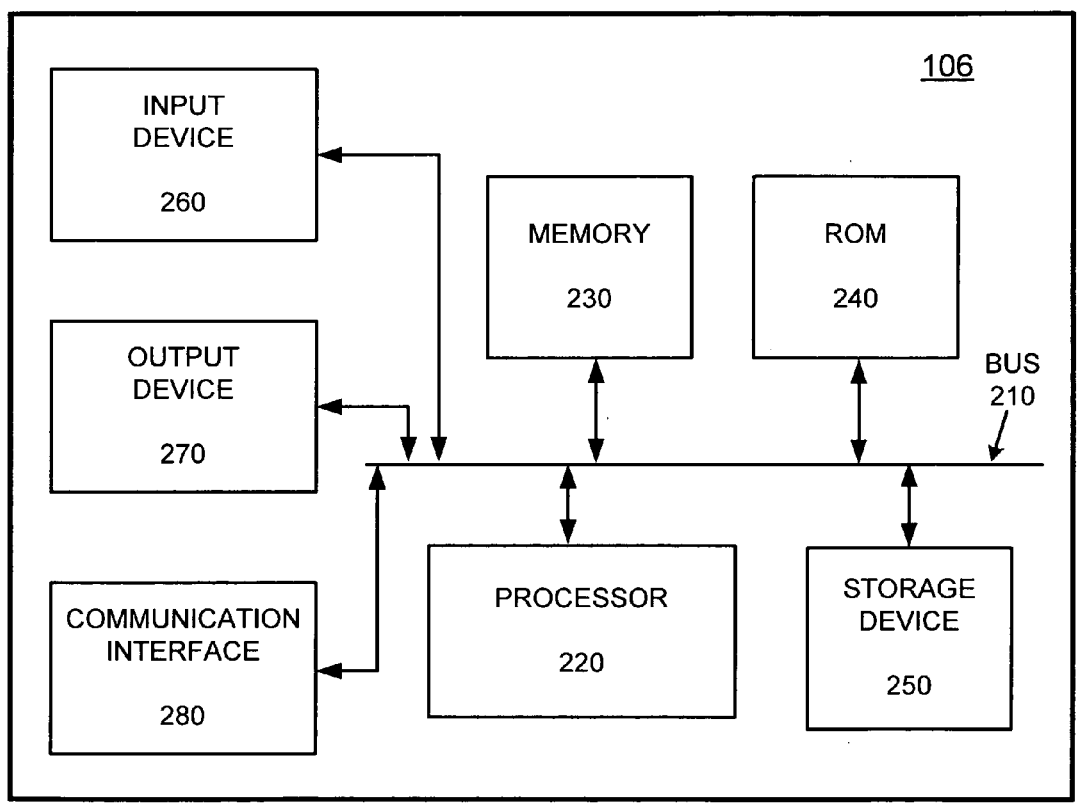
FIG. 2 illustrates an exemplary architecture for implementing the network device of FIG. 1 consistent with the principles of the invention.

FIG. 2 illustrates an exemplary architecture for implementing network device 106 consistent with the principles of the invention. It will be appreciated that user 102, server 110, and/or other devices in system 100 may be similarly configured. As illustrated in FIG. 2, network device 106 may include a bus 210, a processor 220, a memory 230, a read only memory (ROM) 240, a storage device 250, an input device 260, an output device 270, and a communication interface 280.

Bus 210 may include one or more interconnects that permit communication among the components of network device 106.

Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit an operator to input information to network device 106, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables network device 106 to communicate with other devices and/or systems, such as server 110. For example, communication interface 280 may include one or more interfaces, such as a first interface coupled to public network 104 and/or a second interface coupled to private network 108. Alternatively, communication interface 280 may include other mechanisms for communicating via a network, such as private network 108 and/or public network 104.

Network device 106 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Exemplary Configuration

Figure 3:
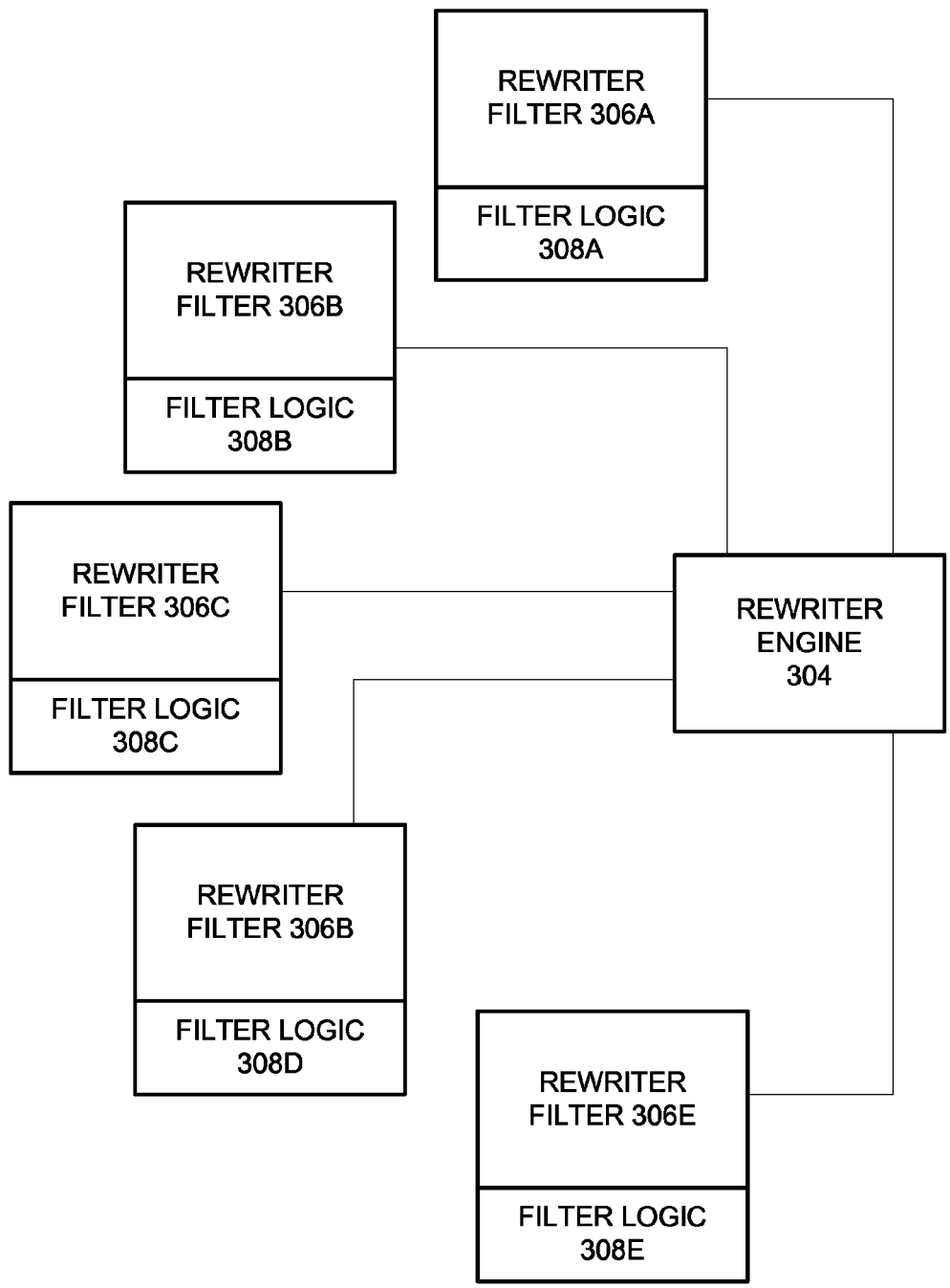
FIG. 3 illustrates an exemplary implementation of a rewriter consistent with the principles of the invention.

FIG. 3 illustrates an exemplary implementation of a rewriter 300 consistent with the principles of the invention. In an exemplary implementation, the elements of rewriter 300 shown in FIG. 3 may be implemented in network device 106. In alternative implementations, some or all of the components illustrated in FIG. 3 may be implemented in other devices or combinations of devices, such as user device 102, network device 106 and server 110.

Referring to FIG. 3, rewriter 300 may include a rewriter engine 304, rewriter filters 306A-306E (hereinafter collectively rewriter filter(s) 306), and filter logic 308A-308E (hereinafter collectively filter logic 308). It should be understood that the number of components in FIG. 3 is provided for simplicity. Rewriter 300 may include more or fewer components.

Rewriter engine 304 may include any device that can perform rewriting functions consistent with the principles of the invention. Rewriter engine 304 may rewrite a request from a user device 102 prior to forwarding the request to a server 110 as a rewritten request. For example, rewriter engine 304 may rewrite a request from a user device 102 so that from a perspective of server 110 the request appears to be intended for the server 110. Rewriter engine 304 may also rewrite responses received from server 110 prior to forwarding responses to user device 102. For example, rewriter engine 304 may replace references to network resources in the response with references to resources on network device 106. The rewritten resources may contain annotations which enable network device 106 to determine which actual server a rewritten request to that resource should be sent to.

Rewriter engine 304 may be implemented in software and/or hardware on network device 106. For example, rewriter engine 304 may be loaded onto network device 106 during manufacture thereof or loaded onto network device 106 at a later time. Rewriter engine 304 may be configured to install rewriter filters 306 that may be used to address particular needs associated with user 102 and/or server 110.

Rewriter filters 306 may include any facility capable of augmenting the operation of rewriter engine 304. Rewriter filters 306 may include software that is adapted to handle situations that rewriter engine 304 cannot handle. For example, assume that a customer has a unique application that an existing version of rewriter engine 304, operating on network device 106, is unable to handle. The customer's unique application may involve, for example, the exchange of complex requests and/or responses between a client device, such as a laptop, and a destination, such as server 110. The existing version of rewriter engine 304 may require modification to correctly rewrite these complex requests and/or responses. Rewriter filters 306 may be used to augment rewriter engine 304 so that these requests and/or responses can be correctly rewritten without making modifications to rewriter engine 304. The use of rewriter filters 306 may provide for an expedient and inexpensive way to improve the operation of rewriter engine 304 and/or network device 106 when existing implementations of rewriter engine 304 and/or network device 106 are unable to operate on request and/or responses, passing through network device 106, in a desired manner.

One or more rewriter filters 306 may be installed on network device 106 and may be configured to operate with rewriter engine 304. In particular, rewriter filters 306 may interact with rewriter engine 304 to properly rewrite requests and responses that pass thorough network device 106. Rewriter filters 306 may include filter logic 308 for executing machine-readable instructions that facilitate rewriting information from a first form into a second form.

Filter logic 308 may include any machine-readable instructions capable of implementing rewriter filters 306. Filter logic 308 may be implemented in software, such as via a general-purpose programming and/or scripting language, such as PERL or another programming language. Filter logic 308 may modify a request as the request passes through the rewriter engine 304.

Filter logic 308 may integrate with rewriter engine 304 to affect various portions of the rewriting process. For example, assume that rewriter engine 304 does not correctly rewrite the header portion of a request received from user device 102. Rewriter filter 306 containing filter logic 308 may be installed to augment the ability of rewriter engine 304 to handle header rewriting to address this shortcoming. Rewriter filters 306 and filter logic 308 may be adapted to operate on a portion of a request and/or response or on an entire request and/or response. For example, a first rewriter filter may be adapted to operate on a header portion of a request and a second rewriter filter may be adapted to operate on a body portion of the request.

Exemplary Implementation of Rewriter Engine with Rewriter Filters

Figure 4:
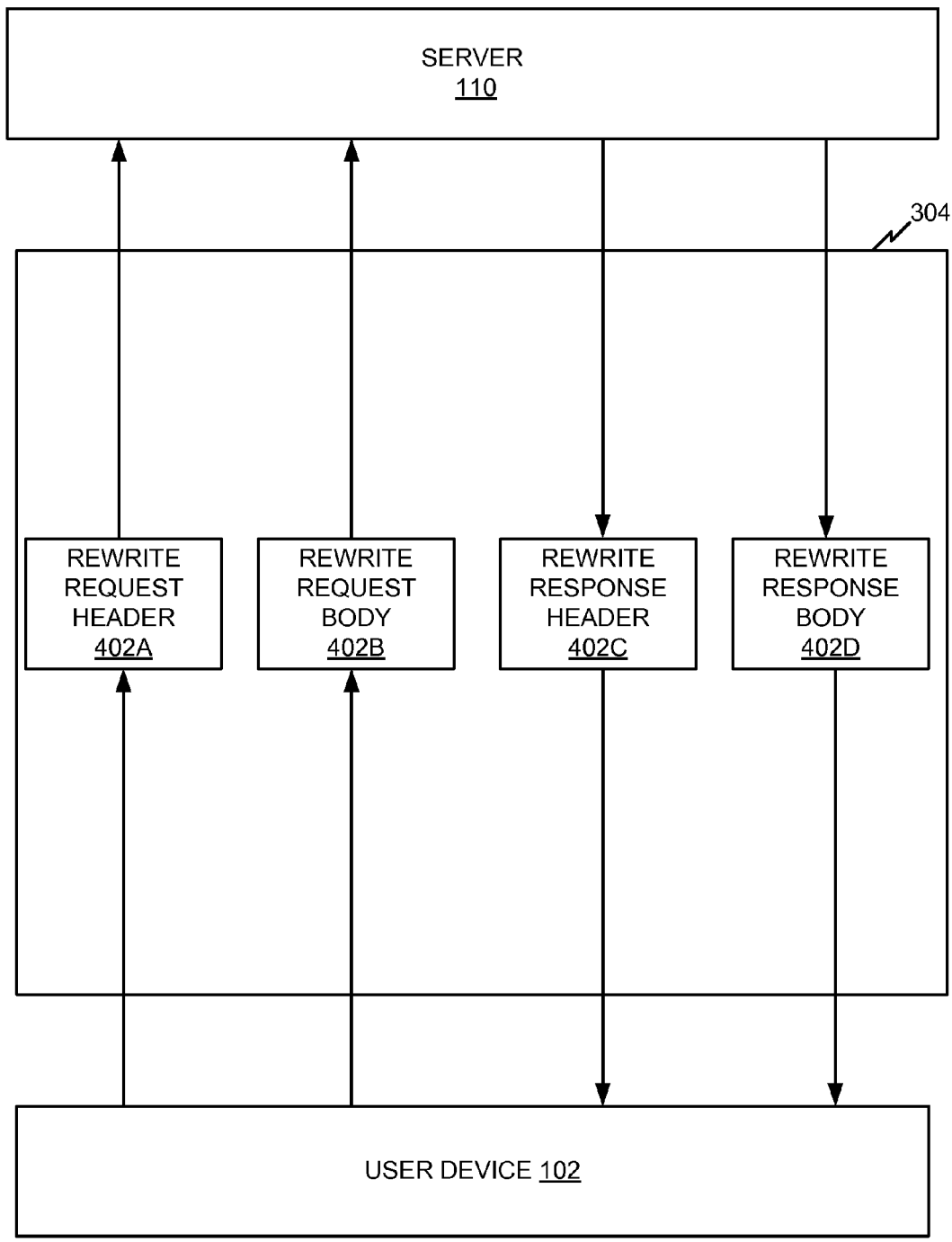
FIG. 4 illustrates an exemplary implementation of a rewriter of FIG. 3 operating with rewriter filters to rewrite requests and responses consistent with the principles of the invention.

FIG. 4 illustrates an exemplary implementation of the rewriter engine 304 of FIG. 3 configured to facilitate communication between user 102 and server 110 consistent with the principles of the invention. Referring to FIG. 4, rewriter engine 304 may include a rewrite request header action 402A, a rewrite request body action 402B, a rewrite response header action 402C, and a rewrite response body action 402D. Rewriter actions 402A-402D may be implemented in logic, such as software. Rewriter filters 306A-306E may intervene in the rewriting process relative to rewriter actions 402A-402D as shown in FIG. 4. The configuration of FIG. 4 represents one possible implementation consistent with the principles of the invention. Substantially any number of other configurations is possible by varying the number, type, and/or arrangement of rewriter actions and/or rewriter filters illustrated in conjunction with FIG. 4 without departing from the spirit of the invention. Moreover, a single rewriter filter may intervene in the rewriting process relative to more than one action; that is, the actions performed by rewriter filters 306A-306E may be performed by a single rewriter filter.

Rewriter engine 304 may include software and/or hardware that support the operation of rewriter actions 402A-402D and rewriter filters 306A-306E. For example, rewriter engine 304 may include a software and/or hardware module that includes rewriter actions 402A-402D and rewriter filters 306A-306E. Rewriter engine 304 may reside on network device 106 to provide network device 106 with rewriter capabilities that allow network device 106 to rewrite requests and/or responses as they pass through network device 106.

For example, rewriter engine 304 may be unable to properly rewrite a response received from server 110. Rewriter engine 304 may be configured to operate with a first rewriter filter (e.g., rewriter filter 306B) to operate on the response received from server 110. The output of the first rewriter filter 306B is then processed by rewriter action 402C. The output of rewriter action 402C may serve as the input to a second rewriter filter 306C. The output of second rewriter filter 306C may be provided to a destination device, such as user device 102. Implementations of rewriter engine 304 may operate with substantially any number and/or combination of rewriter actions 402A-402D and/or rewriter filters 306A-306E.

Rewriter filters may be installed or removed from rewriter engine 304 by an administrator. A rewriter filter may include rewriter logic along with a specification of which network resources to apply the rewriter filter 306A-306E to. For example, rewriter engine 304 may be unable to properly process the resource http://portal.example.com/payroll/paycheck.cgi on its own. A rewriter filter 306 may be installed on network device 106 and may include rewriter logic 308 which is configured to correct the problem with rewriter engine 304. Rewriter filter 306 may also include a specification that rewriter logic 308 should only be applied to the resource http://portal.example.com/payroll/paycheck.cgi. This prevents rewriter logic 308 from adversely affecting other resources. A resource specification associated with rewriter filter 306 may contain a list of resources, and each resource may contain wildcards. Implementations consistent with the principles of the invention may include other devices and/or techniques for specifying which resources to apply implementations of rewriter filter 306 to.

Rewrite request header action 402A may include software and/or hardware that is capable of rewriting information associated with a request header sent from user 102 to server 110. For example, a browser operating on user 102 may send a request to server 110. The request may include a header portion and a body portion. Logic on network device 106 (e.g., rewriter engine 304) may intercept the request and may direct a header associated with the request to rewrite request header action 402A. Rewrite request header action 402A may rewrite the header from a user device form into another form, such as an intermediate form, that may, or may not, be understood by server 110.

Rewrite request body action 402B may include software and/or hardware that is capable of rewriting information associated with a request body associated with a request sent from user 102 to server 110. For example, network device 106 may direct the body portion of the intercepted request, discussed above, to rewrite request body action 402B. Rewrite request body action 402B may rewrite the body portion of the request from a user device form into a second form that may, or may not, be understood by server 110.

Rewrite response header action 402C may include software and/or hardware that is capable of rewriting information associated with a header associated with a response sent from server 110 to user 102. For example, server 110 may issue a response after processing a request received from user 102. The response may include a header portion and a body portion. The response may pass through network device 106 and rewriter engine 304 en route to user 102. Network device 106 may direct the header portion of the response to rewrite response header action 402C. Rewrite response header action 402C may rewrite the header from a first form that can be used by server 110 into a second form that can be used by user 102.

Rewrite response body action 402D may include software and/or hardware that is capable of rewriting information associated with a response body associated with a response sent from server 110 to user 102. For example, network device 106 may receive a response from server 110 and may direct the body portion of the response to rewrite response body action 402D. Rewrite response body action 402D may rewrite the body portion of the response from a form that can be used by a server into a form that may, or may not, be used by user 102.

Rewriter filters 306A-306E may include software and/or hardware that is capable of rewriting incoming data from a first form into a second form before making the rewritten data available to a destination. For example, rewriter filter 306A may receive a header output by rewriter action 402A. Rewriter filter 306A may rewrite the header before making the rewritten header available to server 110.

Rewriter filters 306A-306E may be utilized by rewriter engine 304 according to specific requirements associated with network device 106, rewriter engine 304, or the requests passing through network device 106. For example, rewriter engine 304 may pass a header received from server 110 through rewriter filter 306B prior to applying rewrite response header action 402C.

Rewriter filters 306A-306E may be configured to pass rewritten information, such as a rewritten server response header, and non-rewritten information, such as the original response header received from server 110, to a destination. Passing both rewritten and non-rewritten information to a filter may facilitate error detection and correction by downstream rewriter filters. For example, if rewrite response header action 402C or rewriter filter 306B is unable to properly rewrite a server response header, a downstream rewriter filter, such as rewriter filter 306C, may be able to provide a properly rewritten response header to user 102 by operating on the non-rewritten response header produced by server 110.

Rewriter filters 306A-306E may have access to states associated with data that is processed by the rewriter filters. For example, rewriter filter 306D may receive a server response body that includes a variable at a beginning portion of the response body. This variable may also be used and/or redefined later in the response body. Rewriter filter 306D may be capable of remembering the state of the variable identified at the beginning portion of the response body so that rewriter filter 306D can use the variable while processing information occurring later in the response body. The rewriter filters shown in FIG. 4 (i.e., filters 306A, 306B, 306C, and 306E) may also be configured to store variable state information. Rewriter filters that maintain state information may facilitate processing of large and complex request headers, response headers, request bodies, and/or response bodies.

Rewriter filters 306A-306E may be implemented in programming languages that make it possible for rewriter filters 306A-306E to handle complex rewriting tasks. Implementations of rewriter filters 306A-306E may be implemented in general-purpose scripted programming languages. These scripted programming languages may be essentially platform independent in that rewriter filters may run on substantially any type of platform. For example, one implementation of rewriter filters 306A-306E consistent with the principles of the invention may be implemented in PERL. Rewriter filters 306A-306E implemented in PERL, or a language having similar capabilities, may support the processing and/or rewriting of complex headers and/or bodies. For example, rewriter filters 306A-306E may be able to accommodate mathematical expressions, do loops, decisional statements, such as if statements, defining variables, and/or the maintenance of control flows within scripted rewriter filters.

Rewriter filters 306A-306E implemented in general-purpose programming languages may be integrated with and/or may call other utilities, such as subroutines, software objects, software utilities, and/or links. Called utilities may be internal to rewriter filters 306A-306E and/or may be external. External utilities may reside, for example, in rewriter engine 304, network device 106, server 110 or elsewhere on private network 108 and/or public network 104.

Implementations of rewriter filters 306A-306E may be provided as PERL scripts and may include exemplary functions, such as FilterHeadersToServer, FilterHeadersFromServer, FilterHeadersToBrowser, FilterResponseFromServer, and/or FilterResponseToBrowser. For example, rewriter filter 306A may be implemented as FilterHeadersToServer 306A, rewriter filter 306B may be implemented as FilterHeadersFromServer 306B, rewriter filter 306C may be implemented as FilterHeadersToBrowser 306C, rewriter filter 306D may be implemented as FilterResponseFromServer 306D, and rewriter filter 306E may be implemented as FilterResponseToBrowser 306E.

FilterHeadersToServer 306A may accept as an argument, the headers and the web request that rewrite request header action 402A has rewritten. FilterHeadersToServer 306A may send the rewritten headers and web request to server 110. FilterHeadersToServer 306A may also accept as an argument the original headers received from a web browser associated with user 102. FilterHeadersToServer 306A may operate to adjust headers as needed and may return an argument that includes a web browser request and a reference to a data structure that includes adjusted headers. For example, the reference may be to a data array that includes information associated with adjusted headers arranged in a row by column format. FilterHeadersToServer 306A may operate to adjust headers as needed and may return the adjusted web request and/or the adjusted headers for use by server 110.

FilterHeadersFromServer 306B may accept as arguments a response code and/or the headers of a web browser request that will be rewritten. FilterHeadersFromServer 306B may be called before a response is rewritten by rewrite response header action 402C. FilterHeadersFromServer 306B may return a response code that may be sent to rewrite response header action 402C and/or adjusted headers that may be passed through rewrite response header action 402C. FilterHeadersFromServer 306B may change headers received from a web server, such as server 110, before they are rewritten by, for example, rewrite response header action 402C.

FilterHeadersToBrowser 306C may take as an argument a response code, the rewritten headers, and/or the original headers associated with a rewritten request. FilterHeadersToBrowser 306C may be called after rewrite response header action 402C has rewritten the headers. FilterHeadersToBrowser 306C may return an argument that includes a response code to send to the browser and/or a reference to an argument that includes adjusted headers that can be passed to the browser. FilterHeadersToBrowser 306C may rewrite headers before they are transmitted to a web browser associated with user 102.

FilterResponseFromServer 306D may take a string as an argument and may filter the string to produce a filtered string. FilterResponseFromServer 306D may be called more than once for a response, such as when the response is being rewritten in portions, such as blocks and/or chunks. When logic within rewriter engine 304 has completed a response, FilterResponseFromServer 306D may be called with an empty string. FilterResponseFromServer 306D may buffer data as necessary to accomplish filtering, such as if filtered data is returned after a final call to FilterResponseFromServer 306D. FilterResponseFromServer 306D may make changes to a filtered response after the response has been received from a web server and before it has been rewritten by rewrite response body action 402D.

FilterResponseToBrowser 306E may take a string as an argument and may filter the string to return a filtered string. FilterResponseToBrowser 306E may be called more than once if a response is being rewritten in portions. FilterResponseToBrowser 306E may be called with an empty string if rewriter engine 304 is finished with a response. FilterResponseToBrowser 306E may buffer data as necessary to accomplish its filtering, such as if all of the filtered data is returned after the last call to FilterResponseToBrowser 306E. FilterResponseToBrowser 306E may make changes to a response before a response is transmitted to a web browser associated with user 102.

Rewriter filters 306 may be provided to customers that operate network devices 106 and/or rewriter engine 304 to provide the customers with increased capabilities, such as a capability to correct a software error associated with an implementation of rewriter engine 304.

In one implementation, rewriter filters 306 may be provided to a network device operated by a customer via an upload from a network, via a CD, and/or via other computer-readable medium and/or carrier wave. In addition to the rewriter filters themselves, the customer may be provided with a list that includes identifiers associated with errors that are addressed by the group of rewriter filters 306, resource specifications that may specify, for example, URLs to which rewriter engine 304 and/or rewriter filters 306 may be applied, and/or entry points that may be called by rewriter engine 304 when executing rewriter filters 306. For example, identifiers associated with errors addressed by rewriter filters 306 may include bug numbers that identify a particular software error that a rewriter filter 306 is adapted to address.

Rewriter engine 304 operating on network device 106 that is located at a customer site may be configured to operate with upgrade logic that identifies rewriter filters 306 on network device 106 and/or determines if the rewriter filters 306 are still needed when an upgraded version of rewriter engine 304 is loaded onto network device 106. For example, upgrade logic may receive a list of bug numbers addressed by the new rewriter engine release. The upgrade logic may compare the list of bug numbers against an inventory of rewriter filters 306 currently operating on network device 106. The upgrade logic may disable rewriter filters 306 having identifiers that match bug numbers included in the list. That is, if all the bug numbers associated with a particular rewriter filter 306 are included in the list of bug numbers addressed by a new release of a rewriter engine 304, that particular rewriter filter 306 may be disabled. Disabled rewriter filters 306 may remain on network device 106 in case one or more disabled rewriter filters 306 are needed to process subsequent requests and/or responses.

Operators may individually turn rewriter filters 306 on and/or off and/or turn rewriter filters 306 on and/or off as a group. Rewriter filters 306 may be provided to network devices 106 in an encrypted form to ensure that only properly authorized, such as validly licensed, entities have access to code associated with rewriter filters 306. Encrypted rewriter filters 306 may be decrypted at installation and/or prior to execution by rewriter engine 304 and/or network device 106.

Network device 106 may be adapted to provide a user interface so that information about rewriter filters 306 can be made available to a user and/or system administrator of network device 106. For example, network device 106 and/or rewriter engine 304 may be configured to provide a user interface that displays a list of rewriter filters 306 residing on a network device 106 that is associated with the user. The list may include the names of rewriter filters 306, a description of operations that rewriter filters 306 perform, a description of problems addressed by rewriter filters 306, release dates associated with rewriter filters 306, and/or expiration dates associated with rewriter filters 306. Implementations of rewriter engine 304 may be configured to execute rewriter filters 306 in a safe mode to prevent a rewriter filter 306 from making system calls that can be used to access an operating system associated with a device, such as network device 106 and/or server 110.

Figure 5:
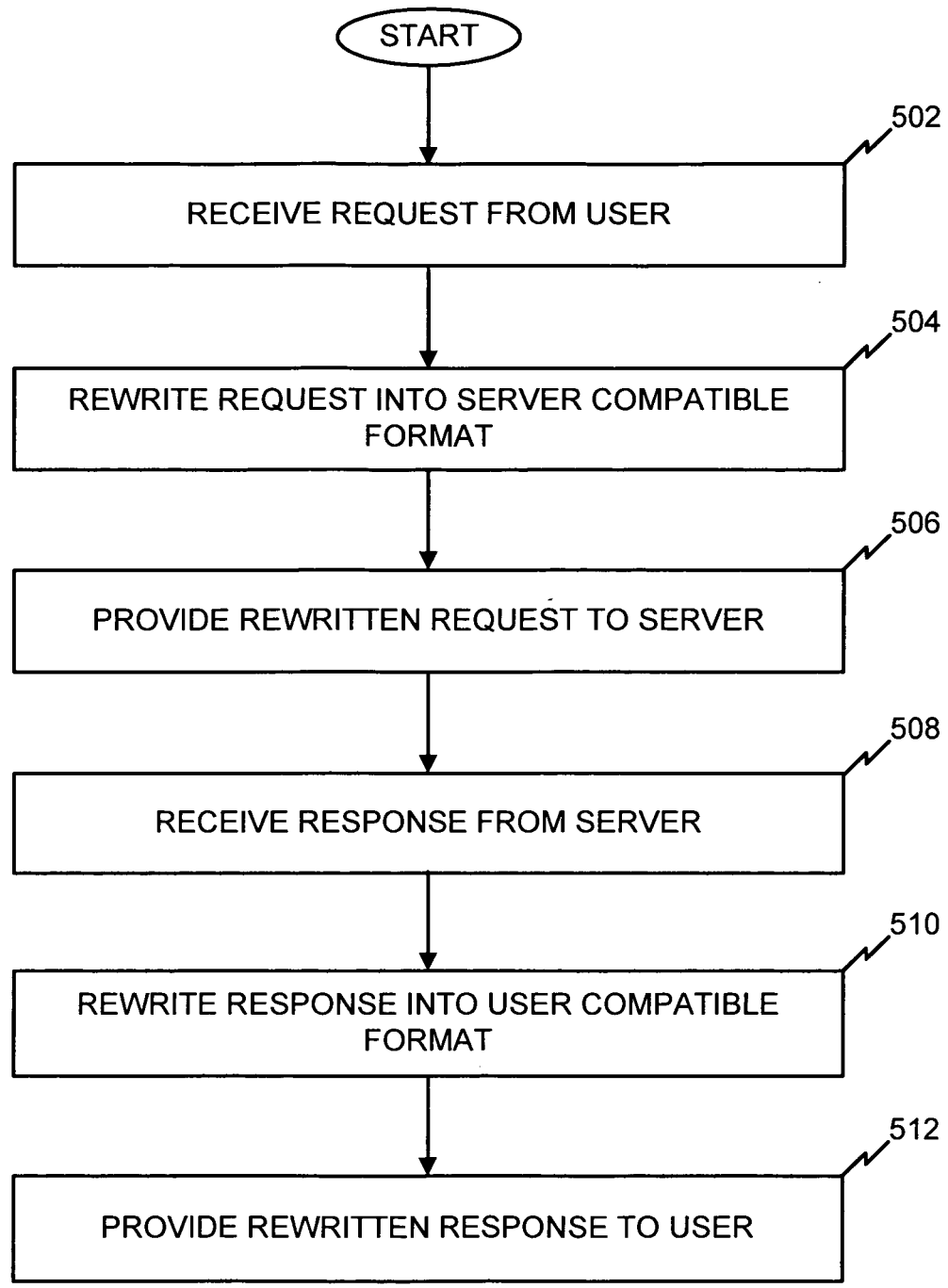
FIG. 5 illustrates an exemplary method for using a rewriter to facilitate communication between a user device and a server consistent with the principles of the invention.

FIG. 5 illustrates an exemplary method for using rewriter engine 304 to facilitate communication between user 102 and server 110 consistent with the principles of the invention. Network device 106 may receive a request, such as an http request from a web browser associated with user 102 (act 502). For example, user 102 may issue an http request for a URL, in a first form that is intended for server 110. The request may include a header portion and a body portion. Network device 106 may intercept the request that includes the URL. A rewriter engine that is associated with network device 106, such as rewriter engine 304, may be unable to correctly rewrite the request into a second form for use with server 110 when operating alone. For example, an employee may be able to interact with a corporate application, such as an expense reporting application operating on server 110, via private network 108 while at the office. The employee's interactions with server 110 may operate correctly because network device 106 is not in the communication path since all messages exchanged between the employee and server 110 are passing over private network 108; however, if the employee attempts to access server 110 from home using, for example, a home computer, the employee may send data over public network 104. Data sent from the employee's home computer may pass through network device 106 en route to server 110 since network device 106 operates between public network 104 and private network 108. Network device 106 may use rewriter engine 304 to rewrite requests received from the employee's home computer. Rewriter engine 304 may also be used to rewrite responses received from server 110. Rewriter engine 304 may rewrite requests and responses in a manner that causes subsequent requests and responses to pass through network device 106 so that network device 106 remains in the communication path between server 110 and the employee's home computer. In certain situations, rewriter engine 304 may not properly rewrite a request and/or response exchanged between server 110 and the employee's home computer.

Rewriter engine 304 may determine what rewriter filters are needed to properly rewrite the request into a rewritten request that can be used by a destination (act 504). For example, rewriter engine 304 may determine that one or more rewriter filters 306A-E are required to correctly rewrite the request associated with the employee's home computer so that the rewritten request can be processed by server 110. Implementations of rewriter engine 304 may use substantially any technique to determine if rewriter filters 306A-E are required to rewrite requests and/or responses.

In one implementation, rewriter engine 304 may call one or more rewriter filter entry points 306A-306E to rewrite the request before sending it to server 110 (act 506). Rewriter engine 304 may call a rewriter filter entry point, such as FilterHeadersToServer 306A, to properly rewrite an output from rewrite request header action 402A before sending it to server 110.

Network device 106 may provide the rewritten request to server 110 (act 508). Server 110 may receive the rewritten request header from FilterHeadersToServer 306A. The rewritten request may also include a rewritten request body that may have been rewritten by, for example, rewrite request body action 402B. Server 110 may operate on the rewritten request header and body and may generate a response. A response may include, for example, web content intended for user 102.

Network device 106 may receive the response (web content) from server 110 (act 510). The response may include a header portion and a body portion.

Network device 106 may rewrite the response via rewriter engine 304 and one or more rewriter filters (e.g., 306B-306E) (act 512). For example, rewriter engine 304 may call FilterHeadersFromServer 306B to rewrite the header portion of the response before rewriter engine 304 applies rewrite response header action 402C to the header. Rewriter engine 304 may call FilterResponseFromServer 306D to rewrite the body portion of the response before rewriter engine 304 applies rewrite response body action 402D to the body.

Rewriter engine 304 may operate with one or more rewriter filters to correct errors with a rewritten header portion and a rewritten body portion of a response. For example, one or more rewriter actions may be unable to properly rewrite the header portion and the body portion of a response. Implementations may use rewriter filters to correct errors associated with portions of the response operated on by the one or more rewriter actions. For example, rewriter filter entry points, such as FilterHeadersToBrowser 306C and FilterResponseToBrowser 306E, may be used to correct errors associated with portions of the response.

Rewriter engine 304 may call FilterHeadersToBrowser 306C to correct errors on the rewritten header portion output from rewrite response header action 402C.

Rewriter engine 304 may call FilterResponseToBrowser 306E to correct errors on the rewritten body portion output from rewrite response body action 402D.

Network device 106 may provide the rewritten response header and rewritten response body to user 102 as, for example, rewritten web content (act 514).

CONCLUSION

Implementations consistent with the principles of the invention may augment the operation of a rewriter engine to accommodate situations where the rewriter engine cannot correctly rewrite requests and/or responses passing through a network device. The implementations may allow the rewriter engine to handle these situations without requiring that the rewriter engine be rewritten and/or upgraded. The rewriter engine may call a rewriter filter that has been adapted to properly address the particular situation. The called rewriter filter may operate alone on requests and/or responses on behalf of the rewriter engine or the rewriter filter may operate in combination with other logic on behalf of the rewriter engine.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using devices and configurations other than those illustrated in the figures and described in the specification without departing from the spirit of the invention. Devices and/or components may be added and/or removed from the implementations of FIGS. 1-4 depending on specific deployments and/or applications. Further, disclosed implementations may not be limited to any specific combination of hardware.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A network device, comprising:
a processor to implement logic to:
receive an indication that a rewriter engine is unable to rewrite a request into a form such that a destination device can operate on the request;
determine that the request is to be rewritten using a rewriter filter associated with the rewriter engine when the indication is received that the rewriter engine is unable to rewrite the request in a manner such that the destination device can operate on the request, and
call the rewriter filter when it is determined that the request is to be rewritten,
rewrite the request using the rewriter filter to generate a rewritten request that can be operated on by the destination device, and
send the rewritten request to the destination device.

2. The network device of claim 1, where the request is received from a client.

3. The network device of claim 1, where the rewriter filter is provided in an encrypted form, where the encrypted form is adapted to prevent the rewriter filter from being called unless the network device is authorized to execute the rewriter filter.

4. The network device of claim 1, where the rewriter filter is authorized via a license.

5. The network device of claim 1, where the rewriter filter is further configured to rewrite the request if the network device is authorized to operate the filter.

6. The network device of claim 1, where the rewriter filter is to operate in a safe mode, where the safe mode prevents the rewriter filter from making system calls that can be used to access the network device.

7. The network device of claim 1, where the rewriter filter is disabled if the rewriter engine is rewriting the request without use of the rewriter filter.

8. A rewriter filter, comprising:
a processor to implement logic implemented via a general-purpose programming language to:
rewrite a request into a rewritten request when an indication is received that a rewriter engine associated with the rewriter filter is unable to rewrite the request in a manner such that a destination device can operate on the request, where the request is rewritten in a manner such that that the destination device can operate on the rewritten request, and
output the rewritten request for sending to the destination device.

9. The rewriter filter of claim 8, where the general-purpose programming language is a scripted programming language.

10. A method to facilitate communication, the method comprising:
calling, by a processor, a rewriter filter that operates in cooperation with a rewriter engine between a first device and a second device when an indication is received that the rewriter engine in unable to rewrite a request in a manner such that the second device can operate on the request;
rewriting the request into a rewritten form via the rewriter filter;

making, by the processor, the rewritten request available to the second device; and receiving, at the processor, a response from the second device, where the response is generated by the second device in response to processing the rewritten request.

11. The method of claim 10, further comprising:
calling the rewriter filter if the rewriter engine is not properly rewriting the request.

12. The method of claim 10, further comprising:
disabling the rewriter filter after the rewriter engine has been fixed to properly rewrite the request without the rewriter filter.

13. The method of claim 10, further comprising:
decrypting the rewriter filter to facilitate rewriting the request.

14. The method of claim 10, further comprising:
identifying a uniform resource locator (URL) pattern associated with the request; and
associating the rewriter filter with the identified URL pattern to facilitate the rewriting the request.

15. The method of claim 10, further comprising:
disabling the rewriter filter if the rewriter engine is modified.

16. A method to facilitate communication, the method comprising:
calling, by a processor, a rewriter filter that operates in cooperation with a rewriter engine between a first device and a second device when an indication is received that the rewriter engine in unable to rewrite a request in a manner such that the second device can operate on the request;
rewriting the request into a first rewritten form via the rewriter filter;
making, by the processor, the first rewritten request available to the second device; and
receiving, by the processor, a response from the second device.

17. The method of claim 16, further comprising:
disabling the rewriter filter after the rewriter engine has been fixed to properly rewrite the response without the rewriter filter.

18. The method of claim 16, further comprising:
identifying a uniform resource locator (URL) pattern associated with the response; and
associating the rewriter filter with the identified URL pattern to facilitate the rewriting the response.

19. The method of claim 16, further comprising:
disabling the rewriter filter if the rewriter engine is modified.

20. A rewriter comprising:
a processor to implement logic to:
receive an indication that a rewriter engine is unable to rewrite a request or a response into a form such that a first destination or a second destination can process the request or the response;
determine that the request or the response is to be rewritten using a filter associated with the rewriter engine when the indication is received, and
the filter to:
receive the request or the response if the request or the response is to be rewritten using the filter, and
rewrite the request into a rewritten request that can be processed by the first destination or rewrite the response into a rewritten response that can be processed by the second destination.

21. The rewriter of claim 20, where the filter is adapted to maintain state information regarding the request, the response, the rewritten request or the rewritten response.

22. The rewriter of claim 20, where the filter is implemented in a scripted programming language.

23. The rewriter of claim 20, where the filter is associated with an identifier that identifies an error associated with information exchanged between the first destination and the second destination.

24. The rewriter of claim 20, where the request or the response is rewritten by the filter until a rewriter engine is modified to properly rewrite the request or the response.

25. The rewriter of claim 20, where the filter is configured to be selectively disabled.

26. A network device, comprising:
means for controlling a rewriter filter;
means for receiving content from a source device;
means for producing a result by operating on the content, the result to facilitate producing rewritten content that can be operated on by a destination device;
means for calling the rewriter filter when an indication is received that the result cannot be operated on by the destination device;
means for operating on the result via the rewriter filter to produce the rewritten content; and
means for making the rewritten content available to the destination device.

* * * * *